No. 897,479. PATENTED SEPT. 1, 1908.
J. NICKERSON.
SOLE EDGE TRIMMER.
APPLICATION FILED MAY 1, 1905.

Witnesses
W. C. Lunsford.
A. W. Knapp.

Inventor:
Joseph Nickerson,
by Crosby Gregory
attys.

UNITED STATES PATENT OFFICE.

JOSEPH NICKERSON, OF ATHOL, MASSACHUSETTS.

SOLE-EDGE TRIMMER.

No. 897,479.  Specification of Letters Patent.  Patented Sept. 1, 1908.

Application filed May 1, 1905. Serial No. 258,185.

*To all whom it may concern:*

Be it known that I, JOSEPH NICKERSON, a citizen of the United States, and a resident of Athol, in the county of Worcester and State of Massachusetts, have invented an Improvement in Sole-Edge Trimmers, of which the following description, in connection with the accompanying drawing, is a specification, like letters on the drawings representing like parts.

This invention relates to machines for trimming the edges of soles during the process of manufacturing shoes and it consists of the novel features hereinafter described and then pointed out in the claims.

Figure 1:
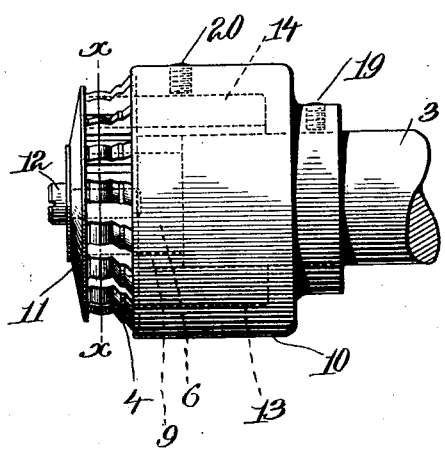
Figure 2:
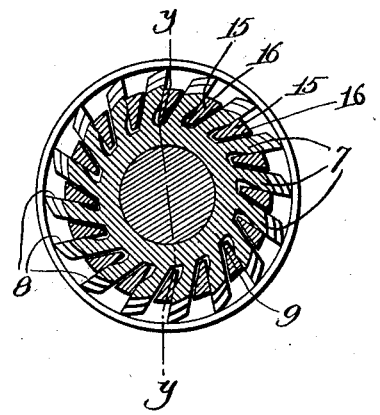
Figure 3:
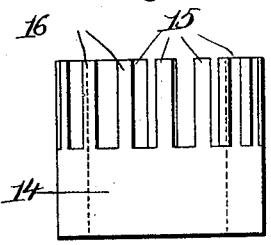
Figure 4:
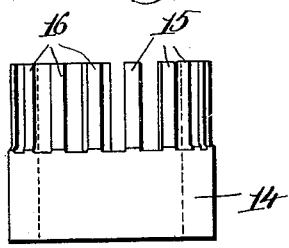
Figure 5:
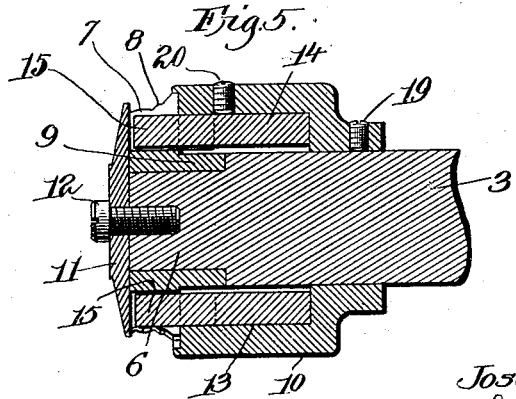

In the drawings Figure 1 is a side elevation of an edge trimmer embodying my invention; Fig. 2 is a section on the line $x$—$x$, Fig. 1; Figs. 3 and 4 are a detail of the guard; and Fig. 5 is a section on the line $y$—$y$, Fig. 2.

3 designates the shaft on which the edge-trimming tool is mounted, said shaft being supported in any suitable or usual bearings (not shown); 4 is the trimming tool or cutter which is of ordinary construction and has the hub 9 which fits over the reduced end 6 of the shaft, and the cutting teeth 7 provided with cutting edges 8; 10 the hub mounted on the shaft and against which the cutting teeth abut, and 11 the shield which sets against the end of the cutter and is secured to the shaft by means of a suitable screw 12. The parts thus far described constitute the main features of a sole-edge trimmer which is well known.

According to my invention I provide the hub 10 with the enlarged chamber 13 and place within said chamber a guard member in the form of a sleeve 14 having at one end the guard fingers 15 which extend parallel with the shaft. This sleeve is adapted to fit over the hub 6 on the cutter, and the fingers 15 are of a shape to fit between the cutter-teeth 7, as shown best in Fig. 2, and of a length to come substantially flush with the end face of the cutter, as shown in Fig. 5. The diameter of the guard member is less than that of the tool portion of the cutter 4 so that the cutting edges 8 of the cutter project slightly beyond the outer faces 16 of the fingers, and said fingers, therefore, act as a means to limit the depth of cut which each cutting edge can make. The hub 10 is made fast to the shaft in any suitable way, as by means of a set screw 19, and the bushing 14 is made fast to the hub by some suitable means, as the set-screw 20. The cutter is loosely mounted on the shaft and is caused to rotate by reason of the fact that the fingers lie between the teeth of the cutter.

The cutter-teeth 7 have to be frequently ground in order to keep them in proper shape, and in order to get the full amount of service from each cutter I provide two or more bushings 14 having guard fingers 15 of different sizes. In Fig. 3 is shown a bushing having guard fingers of the largest size. In Fig. 4 I have shown a bushing in which the fingers 15 are somewhat smaller in size, that is the diameter of that portion of the bushing in which the fingers are formed is less in Fig. 4 than in Fig. 3.

After the teeth 7 of the cutter have become worn to such an extent that they do not project appreciably beyond the outer faces 16 of the guard fingers 15 another bushing 14 having smaller teeth may be substituted.

Having described my invention what I claim as new and desire to secure by Letters Patent is:—

1. In an edge trimmer, the combination with a shaft of a cutter thereon having radially-extending teeth, a hub secured to the shaft back of the cutter and provided with an axial chamber, a cylindrical guard bushing received within said chamber, and means to detachably secure said bushing to the hub, said bushing being of less diameter than the toothed portion of the cutter and having guard fingers located between the teeth of the cutter and extending beyond the hub and substantially the full width of the cutter.

2. In an edge trimmer, the combination with a shaft of an axially-chambered hub fast thereon, a cutter mounted on the shaft situated closely adjacent to the hub, and a bushing having one end received within said chamber of the hub and having at the other end guard fingers extending between the teeth of the cutter and substantially to the front face thereof and means to rigidly but detachably secure the bushing to the hub, the diameter of the toothed portion of the bushing being slightly less than the diameter of the toothed portion of the cutter.

In testimony whereof, I have signed my name to this specification, in the presence of two subscribing witnesses.

JOSEPH NICKERSON.

Witnesses:
ALFRED SWEETER,
PATRICK H. BROWN.